Figure 1:
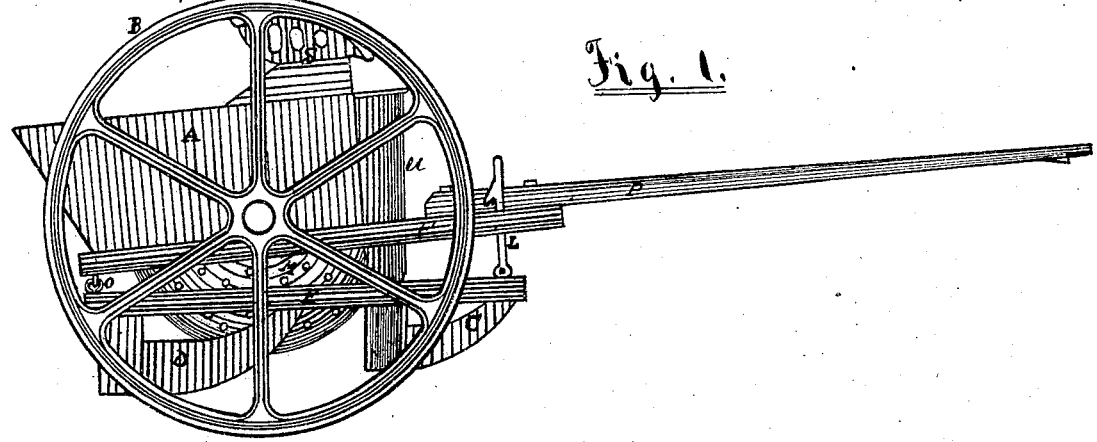

1871.

L. Augs Aspinwall — Potato Planter.

No. 119,687. Patented Oct. 10, 1871.

Witnesses. Inventor.
N. DeWitt L. Augs Aspinwall
Fred H. Mann

UNITED STATES PATENT OFFICE.

L. AUGUSTUS ASPINWALL, OF ALBANY, NEW YORK.

IMPROVEMENT IN POTATO-PLANTERS.

Specification forming part of Letters Patent No. 119,687, dated October 10, 1871; antedated September 30, 1871.

*To all whom it may concern:*

Be it known that I, L. AUGUSTUS ASPINWALL, of Albany, State of New York, have invented certain Improvements in Potato-Planters, of which the following is a specification, the drawing forming a part thereof.

Figure 2:
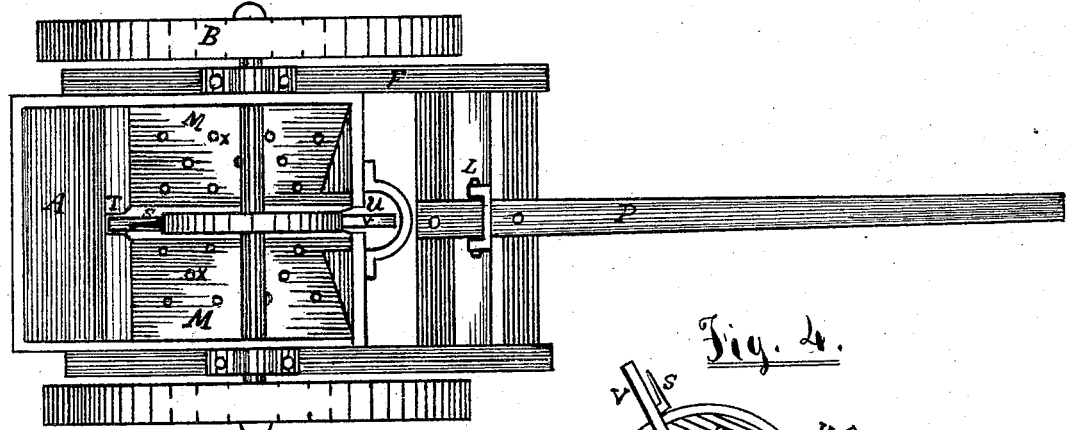
Figure 3:
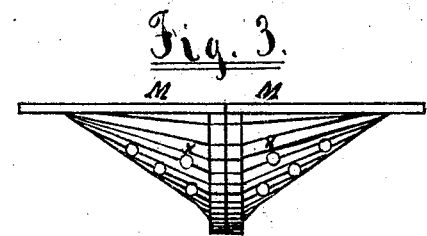
Figure 4:
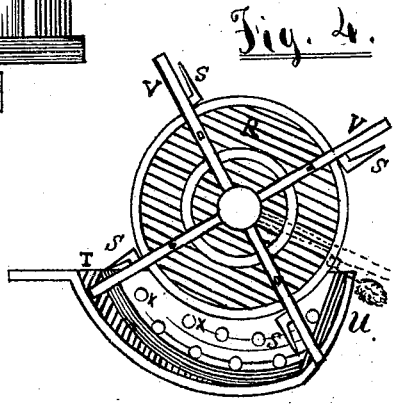

Figure 1 is a side elevation of a machine embodying my invention. Fig. 2 is a plan of the same. Fig. 3 represents the bottom of the hopper. Fig. 4 represents a side elevation of the spears and concave.

F is the frame of the machine; B, the drive or ground-wheels; A, the hopper for the reception of the potatoes. M M are the metallic perforated bottoms of the hopper, made in halves in order that the width of the concave may be set as desired; also, to facilitate molding and casting the same. $x$ $x$ are the perforations to allow the dirt to pass from the potatoes out of the hopper; P, the hole; E, the supplementary frame hinged to the main frame at $o$, upon which the plow and coverers C and D are fastened; L, the bail for raising the plow and coverers while turning or driving from field to field. S' is the seat. R is the disk upon which the spears are fastened, being upon and rotated by the axle of the drive-wheels. S are the spears, the same being riveted or cast in the bars or arms V. T is the groove in which the arms move when the disk revolves; U, the conductor for delivering the potatoes to the furrow made by the plow.

The difficulty heretofore existing in devices for planting potatoes has been the planting of a single piece or tuber without regard to size or shape (which is variable) every time at the required distance. Spears in the form of hooks have been used, but without the desired results. In my invention I introduce an entirely new device in the form of what I term radial spears and arms, which work or revolve within a concave. It will be seen that these arms V revolve in the groove T, formed by the two bottoms M M. The spears are shorter than the arms, and in front, in order that the potato, by the inclined sides of the bottom, may roll under the points, and, supported by the arms, be moved forward and driven on by the increased pitch of the concave, as seen in Fig. 4; it is also removed by the same plan at U by the increased pitch outward.

It will be seen that the operation is positive, and can pick but one tuber at a time.

I do not confine myself to a single spear or point, as they may be made with two or more, so as to prevent the potato from turning; neither do I hold that they are best round, but may be made flat as a blade, which thus far has proved good. If it is desired, the spears may be made movable, drawing in and out from the center with a concave having no increase of pitch, and operate in the same manner.

The bottom of the hopper is made in two parts for two reasons, viz., the difficulty of casting a piece of such a form as a whole, and also to increase or diminish the width of the groove in which the arms move. The perforations in the bottom of a machine provided with spears are absolutely necessary to allow the dirt to pass off, as it cannot be lifted out with the potatoes. It will be seen that the bottom is metal, as it cannot be made to withstand the moisture of potatoes and rain which it is subjected to, it being perforated, thin, and of an uneven form. I also find by experience that swinging the plow and coverers from the rear of the main frame has many advantages over my former method of swinging from the front, viz., that the plow enters the ground more readily; that it can be held up by the bail L more easily than down, as would otherwise be if swung from the front; also, that it can be more easily raised by the driver while turning.

I claim as my invention—

1. The arms V, or their equivalents, provided with the radial spears S, substantially as and for the purpose set forth.

2. The metallic perforated hopper bottom M M, having an increased pitch, substantially as and for the purpose set forth.

3. The arrangement of the supplementary frame E with the main frame F at O, as and for the purpose set forth.

L. AUGS. ASPINWALL.

Witnesses:
A. V. DEWITT,
FREDK. H. MANN.